UNITED STATES PATENT OFFICE.

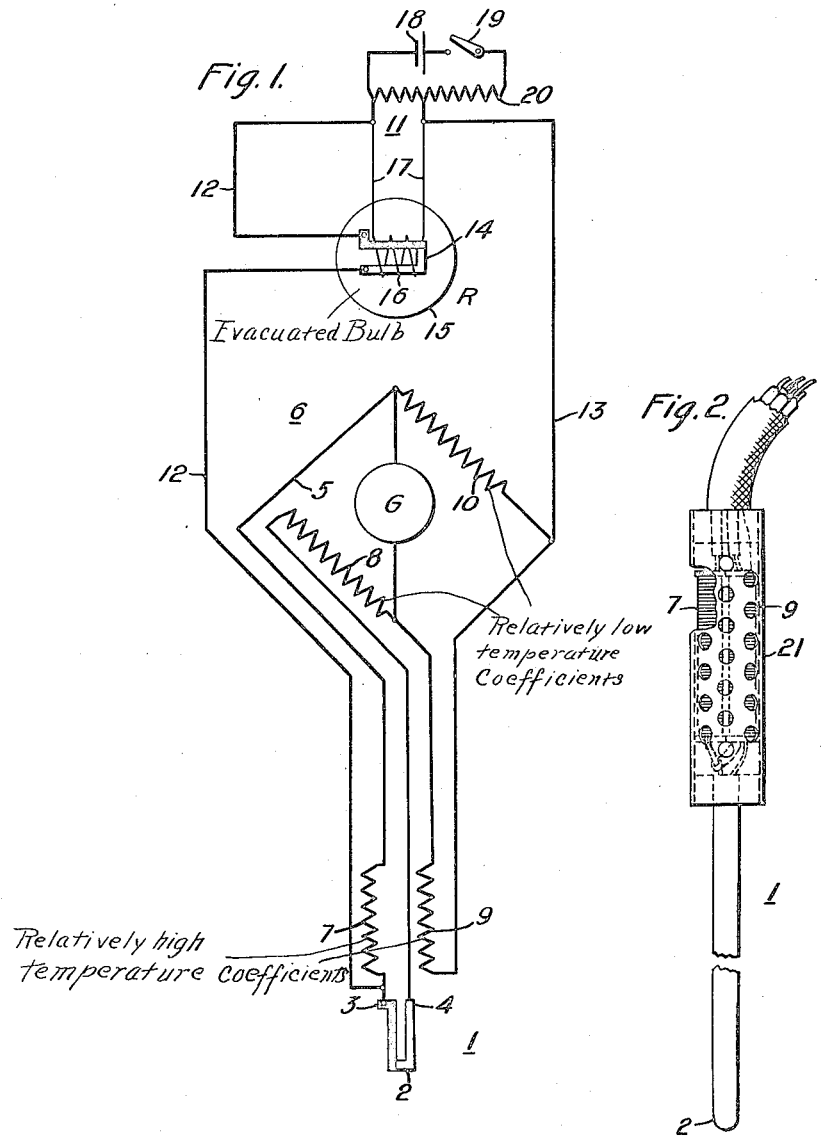

GUNNAR JENSEN, OF SWISSVALE, PENNSYLVANIA, ASSIGNOR TO WESTINGHOUSE ELECTRIC & MANUFACTURING COMPANY, A CORPORATION OF PENNSYLVANIA.

TEMPERATURE-MEASURING DEVICE.

1,411,033.   Specification of Letters Patent.   Patented Mar. 28, 1922.

Application filed March 8, 1919. Serial No. 281,480.

*To all whom it may concern:*

Be it known that I, GUNNAR JENSEN, a citizen of the United States, and a resident of Swissvale, in the county of Allegheny and State of Pennsylvania, have invented a new and useful Improvement in Temperature-Measuring Devices, of which the following is a specification.

My invention relates to temperature-measuring instruments and particularly to measuring instruments comprising thermo-couples.

One object of my invention is to provide a device of the above indicated character that shall have means for automatically effecting a constant operating voltage therefor.

Another object of my invention is to provide a Wheatstone bridge, for a temperature-measuring instrument, in which resistance legs of relatively high-temperature co-efficient, that are utilized to compensate for variations in the cold-junction temperature of a thermo-couple, shall be located adjacent the latter.

In temperature-measuring instruments employing a temperature-compensated Wheatstone bridge or other device, together with a thermo-couple, it is essential to employ an auxiliary source of electromotive force which, to ensure effective operation of the instrument, must necessarily be of constant value.

An instrument of this type, when adjusted at a predetermined reference temperature, automatically compensates for variations in the temperature at the cold-junction of a thermo-couple, so that the true value of the temperature being determined may be readily obtained or directly read from a galvanometer or other instrument.

While devices have been employed in which the above mentioned auxiliary source of electromotive force has varied only slightly, even a slight variation therein will cause an error in the readings, and I am not aware that any such auxiliary source of electromotive force, less variable than an ordinary primary battery, has been used.

Further, for structural compactness, certain of these devices have been constructed with the resistance legs of high-temperature co-efficient located in a receptacle with the other members of the bridge, or otherwise remotely disposed with respect to the thermo-couple, with which they have been connected by relatively long leads. This has also been a source of error in the readings, because of differences in temperatures sometimes existing at the locations of the cold-junction and the other members of the instrument.

In practicing my invention, I provide means for opposing the auxiliary source of electromotive force by an electromotive force, that varies in accordance with the auxiliary electromotive force to automatically maintain the resultant or effective electromotive force at a constant value. Further, by locating the high-temperature resistance legs of the Wheatstone bridge in proximity to the cold-junction of the thermo-couple, compensation for variations in the temperature at the cold junction will be more accurately effected than when the high-temperature legs and the cold-junction are spaced apart and connected by leads.

Figure 1 of the accompanying drawing is a diagrammatic view of an instrument embodying my invention and Fig. 2 is a partially-broken outline view of a thermo-couple structure embodied in my invention.

A thermo-couple 1, having a hot-junction 2 and cold-junctions 3 and 4, is connected in series with one side 5 of a Wheatstone bridge 6 and between the resistance legs 7 and 8 of the side 5. Resistance legs 9 and 10 and the galvanometer G complete the bridge 6 that is connected to an auxiliary source of electromotive force 11, by conductors 12 and 13.

A regulator R, having a thermo-couple 14, disposed in an evacuated bulb 15 and connected in series with the conductor 12, receives heat from a coil 16 disposed in the bulb 15 and connected across the source of electromotive force 11 by conductors 17.

The source of electromotive force 11, as here illustrated, consists of a primary battery 18 that is connected in series with a switch 19 and a resistor 20. The conductors 12, 13 and 17 may be connected to include any desired portion of the resistor 20 for the purpose of reducing the value of the voltage utilized from the source 18.

The legs 7 and 9 consist of metal, such as copper, having a relatively-high temperature co-efficient, and the legs 8 and 10 are of metal, such as manganin, having a relatively-low temperature co-efficient.

With the junctions 2, 3 and 4 at a certain predetermined temperature, as, for example, normal room-temperature of 25° C., and the voltage of the source 11 impressed across the bridge 6, the latter is adjusted to indicate no deflection of the galvanometer. Under this condition, when the temperature of the hot-junction 2 is changed, the electro-motive force generated thereby will be indicated by the galvanometer G, in direct proportion to the degree of such temperature change.

Should any variation in the room or reference temperature occur, the resistance of the legs 7 and 9 would change accordingly, thereby compensating for the variation in the value of the thermal E. M. F. of the thermo-couple by maintaining the unbalance of the bridge at the degree of unbalance obtained before the variation of the reference temperature occurred.

Thus, if the room or reference temperature should increase ten degrees, the E. M. F. of the thermocouple would decrease and the value of the unbalance measured by the galvanometer would tend to decrease, thereby to indicate a lower temperature at the hot junction of the couple 1. However, the increased resistance of the legs 7 and 9 so changes the relation of the bridge elements as to maintain the unbalanced voltage relations that obtained before the room temperature changed. The galvanometer would, therefore, indicate the same temperature as it indicated before the room temperature changed.

Thus, while the room temperature remains constant, the galvanometer indicates directly the temperature of the hot junction by reason of the variation of the thermal E. M. F. of the couple 1. When the room temperature varies, the bridge relations are changed to compensate for the variation of the thermal E. M. F. of the couple and the galvanometer is maintained energized to a degree corresponding to the temperature of the hot junction.

This will occur automatically over a relatively wide range of the temperature at the cold-junction, thereby compensating for the change in the electromotive force of the thermo-couple 1, from this cause, and permitting the indications of the galvanometer G, at all times, to be of direct and true values, accordingly as the hot-junction temperature changes with respect to the reference temperature.

In order to maintain the electromotive force of the auxiliary source 11 of constant value, so that errors from this source may not occur, the thermo-couple 14 is disposed in series with the conductor 12 in a manner to oppose the voltage of the source 11. The coil 16 is heated in accordance with the current from the source 11, so that the thermal electromotive force of the couple 14 will be in direct proportion to the voltage of the source 11. By constructing the regulator R to have the proper correction characteristics—that is, by constructing it to such form and of such materials that its change in electromotive force will be in proportion to the change or drop in the source 11, the auxiliary electromotive force may be automatically maintained constant for a relatively long period of time.

By positioning the compensating resistors 7 and 9 adjacent to the cold-junction of the thermo-couple, corrections for cold-junction-temperature changes will be effected more readily than if the same were located some distance from the thermocouple. In Fig. 2, a perforate tubular container 21, of fiber or other suitable material and constituting a handle member for the thermo-couple 1, supports the resistors 7 and 9 in a convenient and effective manner.

While I have shown and described a particular form of my invention, changes may be effected therein without departing from the spirit and scope thereof, as set forth in the appended claims.

I claim as my invention:

1. A temperature-measuring instrument comprising a thermo-couple, a Wheatstone bridge operatively connected thereto in which the respective sides have resistance legs of high and low-temperature co-efficients, respectively, to compensate for variations in the cold-junction temperature, and means for impressing an automatically-maintained constant voltage across said bridge.

2. A temperature-measuring instrument comprising a thermo-couple, a Wheatstone bridge operatively connected thereto in which the respective sides have resistance legs of high and low-temperature co-efficients, respectively, to compensate for variations in the cold-junction temperature, means for impressing a voltage across said bridge, and automatic means for maintaining said voltage constant.

3. A temperature-measuring instrument comprising a thermo-couple, a Wheatstone bridge operatively connected thereto in which the respective sides have resistance legs of high and low-temperature co-efficients to compensate for variations in the cold-junction temperature, means for impressing a voltage across said bridge, and thermal means for maintaining said voltage constant.

4. A temperature-measuring instrument comprising a thermo-couple, and a Wheatstone bridge operatively connected thereto in which the respective sides have resistance legs of high and low-temperature co-efficients, respectively, to compensate for variations in the cold-junction temperature, said legs only of high-temperature co-efficient being disposed adjacent the cold-junction.

5. A temperature-measuring instrument comprising a thermo-couple, a Wheatstone bridge operatively connected thereto in which the respective sides have resistance legs of high and low-temperature co-efficients, respectively, to compensate for variations in the cold-junction temperature, said legs only of high-temperature co-efficient being disposed adjacent the cold-junction, and means for impressing an automatically-maintained constant voltage across said bridge.

6. A temperature-measuring instrument comprising a thermo-couple, and a Wheatstone bridge in which the respective sides have resistance legs of high and low-temperature co-efficients, respectively, to compensate for variations in the cold-junction temperature, said thermo-couple being disposed in series with, and between, the legs of one of said sides.

7. A temperature-measuring instrument comprising a thermo-couple, a Wheatstone bridge in which the respective sides have resistance legs of high and low-temperature co-efficients, respectively, to compensate for variations in the cold-junction temperature, said legs of high-temperature co-efficient being disposed adjacent the cold-junction, and said thermo-couple being disposed in series with, and between, the legs of one of said sides.

8. In a temperature-measuring instrument, the combination with a Wheatstone bridge, of means comprising a plurality of opposing sources of simultaneously and proportionately changeable potentials for automatically maintaining a constant voltage across said bridge.

9. In a temperature-measuring instrument, the combination with a Wheatstone bridge, of means comprising a source of potential, and a second source of relatively-small potential opposed to said first potential for automatically maintaining a constant voltage across said bridge.

10. In a temperature-measuring instrument, the combination with a Wheatstone bridge, of means comprising a source of potential, a second source of relatively-small potential, that is actuated by, and opposes, said first source of potential, for automatically maintaining a constant potential across said bridge.

11. An electrical-measuring instrument having a source of potential and a second source of relatively-small potential energized by said first source of potential and that varies in accordance with, and opposes, said first source of potential.

12. The method of maintaining a potential difference between two points of a circuit constant irrespective of variations in the value of E. M. F. of the source which consists in employing a circuit in parallel with the former circuit for controlling the former circuit in accordance with variations in the value of E. M. F. of the source.

13. The method of maintaining a potential difference between two points of a circuit constant irrespective of variations in the value of E. M. F. of the source which consists in employing a circuit in parallel with the former circuit for controlling a thermocouple in the former circuit in accordance with variations in the value of E. M. F. of the source.

14. The method of maintaining a potential difference between two points of a circuit constant irrespective of variations in the value of E. M. F. of the source which consists in controlling a variable voltage in the circuit in accordance with variations in the value of E. M. F. of the source.

15. The method of maintaining a potential difference between two points of a circuit constant irrespective of variations in the value of E. M. F of the source which consists in controlling an auxiliary source of E. M. F. in accordance with variations of the main source to control the effectiveness of the main source.

16. In a measuring system, the combination with two parallel circuits supplied from the same source, of means included in one circuit for controlling the electrical conditions of the other circuit.

17. The method of measuring temperatures which consists in maintaining a constant voltage across a Wheatstone bridge, unbalancing the bridge by means of a thermocouple in accordance with the temperature being measured, and compensating for variations in the temperature of the cold junction of the couple by varying the relation between the bridge elements in accordance with the variation of the temperature of the cold junction.

18. A temperature measuring instrument comprising a Wheatstone bridge embodying an element having a relatively high temperature coefficient, a source of constant E. M. F. connected between two points of the bridge, a measuring instrument connected between the other two points of the bridge, and a thermocouple connected in a portion of the circuit included between two points of the bridge respectively connected to the galvanometer and the source of E. M. F.

In testimony whereof, I have hereunto subscribed my name this 27th day of Feb., 1919.

GUNNAR JENSEN.